UNITED STATES PATENT OFFICE.

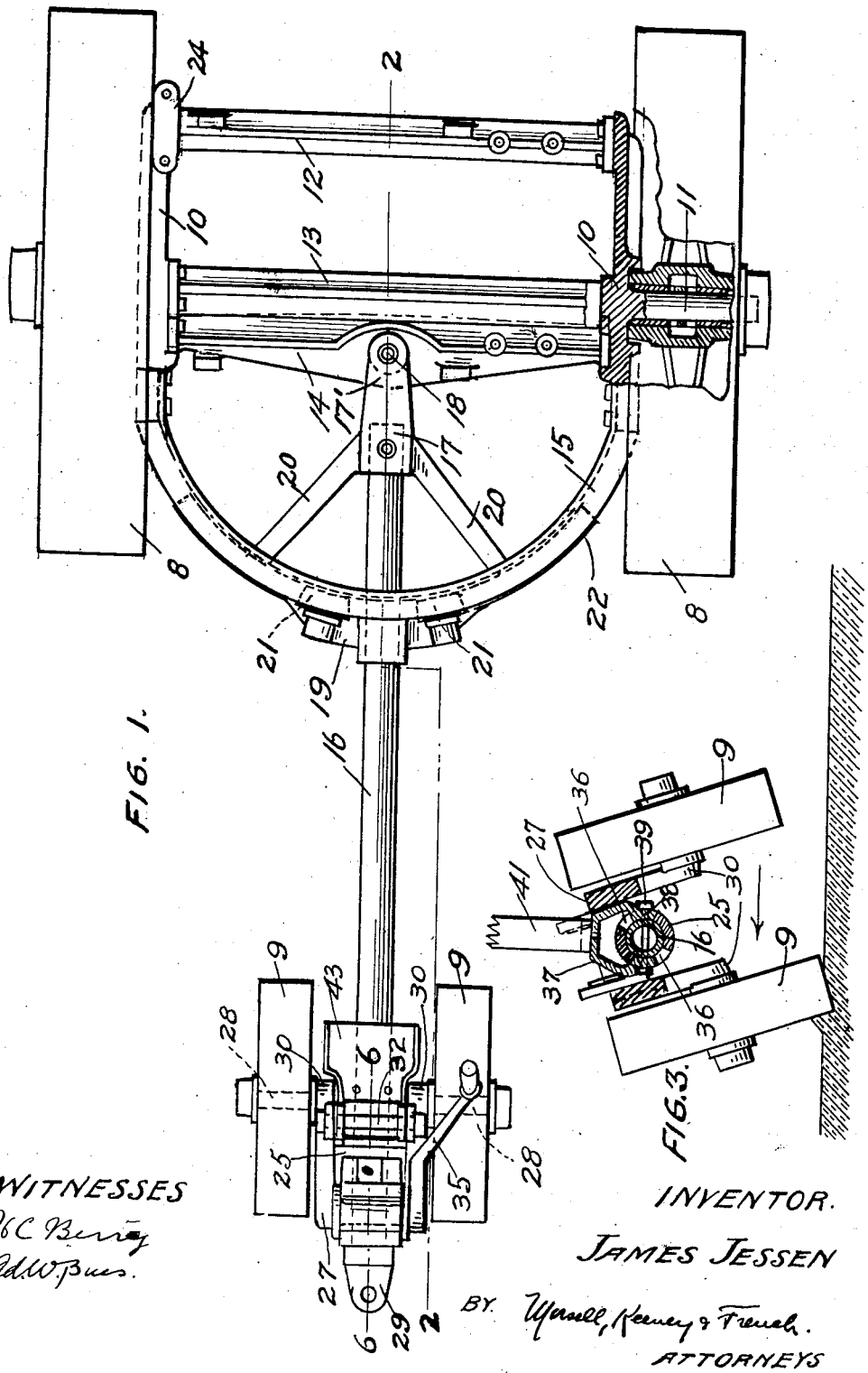

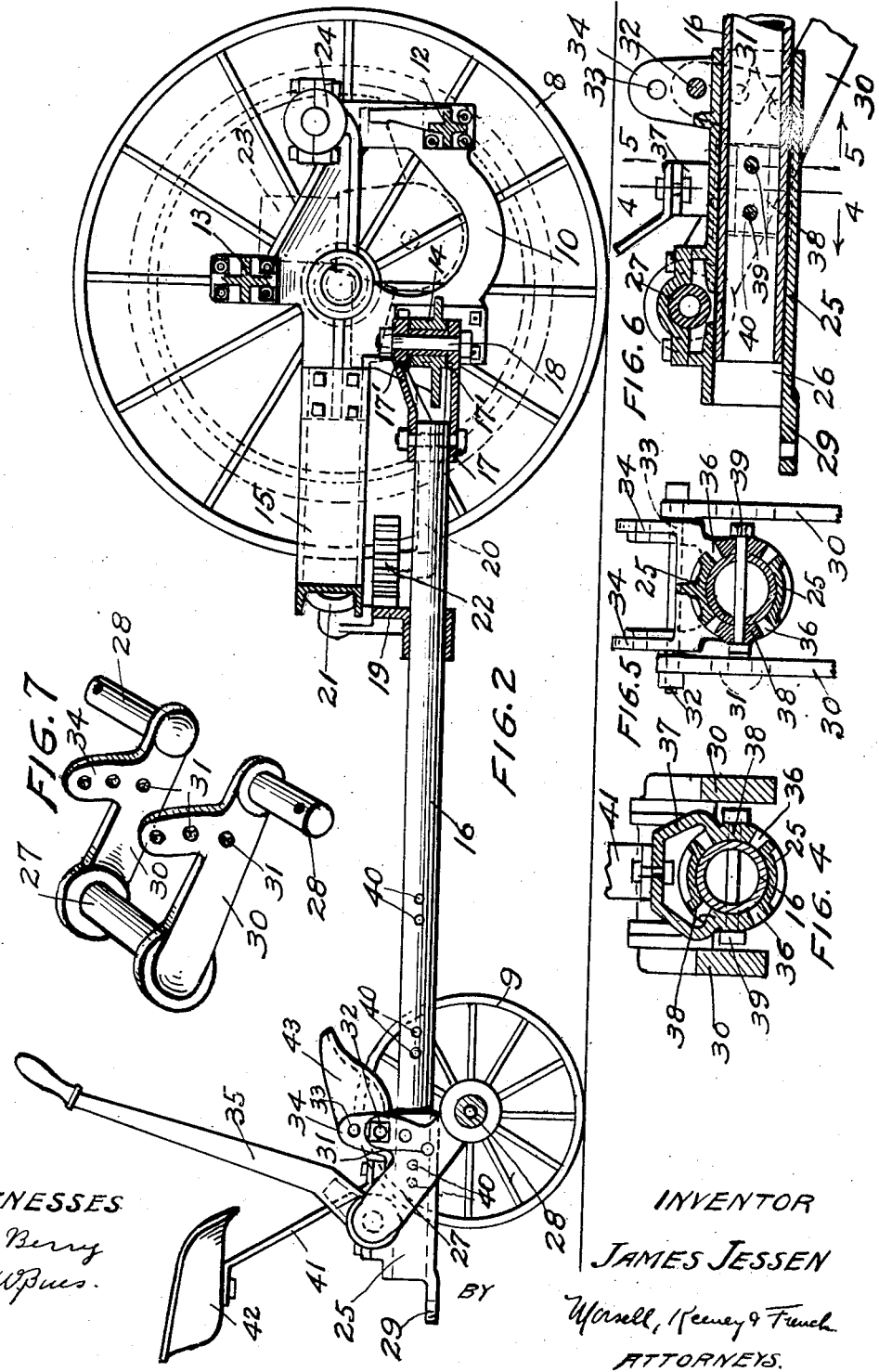

JAMES JESSEN, OF MILWAUKEE, WISCONSIN, ASSIGNOR TO THE LINE DRIVE TRACTOR, INC., OF MILWAUKEE, WISCONSIN, A CORPORATION OF SOUTH DAKOTA.

TRACTOR.

1,340,169.  Specification of Letters Patent.  Patented May 18, 1920.

Application filed October 20, 1917. Serial No. 197,575.

*To all whom it may concern:*

Be it known that I, JAMES JESSEN, a citizen of the United States, and resident of Milwaukee, in the county of Milwaukee and State of Wisconsin, have invented new and useful Improvements in Tractors, of which the following is a description, reference being had to the accompanying drawings, which are a part of this specification.

The invention relates to tractors.

One of the objects of this invention is to provide a new and improved form of tractor frame.

Another object of the invention is to provide a connection between the rear supporting wheels and the frame of such a character as to allow swinging movement of the wheels with respect to the frame so that the tractor may proceed over uneven ground.

With these and other objects in view the invention consists in the several features hereinafter set forth.

In the drawings:

Figure 1 is a plan view of the device embodying the invention, parts being broken away and parts being shown in section;

Fig. 2 is a section taken on the line 2—2 of Fig. 1;

Fig. 3 is a transverse sectional view taken through the tongue member, revoluble sleeve, and sleeve stop showing the position of the rear supporting wheels under conditions hereinafter described;

Fig. 4 is a section taken on the line 4—4 of Fig. 6;

Fig. 5 is a section taken on the line 5—5 of Fig. 6;

Fig. 6 is a section taken on the line 6—6 of Fig. 1;

Fig. 7 is a detail view of supporting yoke for the rear wheels.

In general the device comprises front tractor wheels 8, rear supporting wheels 9, a main frame mounted upon the front wheels, a rearwardly extending tongue 16, and means for supporting the rear wheels to allow swinging movement of the rear wheels when the tractor is running over uneven ground.

The main frame comprises similar side frame members 10 having laterally extending axles 11 integral therewith upon which the tractor wheels 8 are mounted, transverse frame members 12, 13 and 14 bolted or otherwise secured to the members 10 to form a rigid construction, and an arc-shaped channel frame member 15 bolted or otherwise suitably secured to the frame members 10.

The rearwardly extending tubular tongue 16 is pivotally secured to the transverse frame member 14 by means of a tongue fitting 17 and a king bolt 18 passing through the ends 17' of said fitting and through the frame member 14 whereby the angular relation between the rigid portions of the frame and the tongue may be changed to assist in steering the tractor.

To properly guide and support the tongue 16 in swinging about the king bolt 18 an arc-shaped fitting 19 is mounted upon the tongue 16 at its central portion and secured near its ends to arms 20 integral with the fitting 17, said arc-shaped fitting carrying spaced apart guide rollers 21 which run in the channel frame member 15. A segmental rack 22 used in steering is also formed in the fitting 19 and is designed to be operated through mechanism shown and described in my copending application Serial No. 202,125, filed Nov. 15, 1917.

The transverse members 12 and 14 carry the engine 23 shown in dotted lines in Fig. 2 and other operative parts of tractor driving and controlling mechanism not shown. The side frame members 10 have bearings 24 for receiving a drive shaft, not shown which is connected by gearing, not shown, to drive the tractor wheels 8.

The means for supporting the rear wheels 9 comprise a frame member 25 having a bore 26 therein into which the rearward portion of the tongue 16 fits so that said fitting may be moved to different positions along the tongue and so that it may swing about the tongue, and a yoke 27 pivotally mounted upon member 25 and having axles 28 integral therewith upon which the wheels 9 are mounted.

The member 25 has a rearwardly extending projection 29 apertured to form a draw bar hitch and, to provide for vertical adjustment of this hitch, the arms 30 of the yoke 27 are provided with a plurality of alined sets of apertures 31. A bolt 32 passes through alined apertures 33 on lugs 34 of the member 25 and through any one set of alined apertures 31, a lever 35 being secured to the yoke to assist in raising it for changes in vertical adjustment.

With the construction thus far described it will be noted that the frame member 25 which carries the yoke 27 and the wheels 9 may swing about the tongue 16 so that when the tractor is proceeding over uneven ground and either one of the front wheels are raised the rear wheels 9 will remain on the ground under ordinary conditions.

Under unusual conditions as where one of the front wheels meets with an obstruction which tends to swing the tractor around with the rear wheels tending to slide over the ground and one of said rear wheels meets with an obstruction whereby the rear wheels are tipped up, as shown in Fig. 3, it is necessary to limit this tilting movement of the rear wheels. This is accomplished by forming alined slots 36 in the member 25 and providing a yoke 37 the curved ends 38 of which are secured to the tongue 16 by bolts 39 passing through said ends and through any one of sets of apertures 40 in the tongue, the ends 38 being of less length than the width of the slots 36 so as to provide a limited swinging movement of the member 25 about the tongue, the ends 38 serving as stops. In addition to serving as stops the ends 38 being secured to the tongue 16 and disposed within the slots 36 serve to secure the member 25 in different positions of adjustment along the length of the tongue, the position of the member 25 being varied by moving the member 25 along the tongue to bring the bolts 39 into register with different sets of apertures 40.

A seat support 41 is secured to the yoke 37 and carries a seat 42 and a foot rest 43 is secured upon the top of the member 25.

With this construction it will be noted that I have provided a simple and substantial frame for the tractor and that provision is made for maintaining all four wheels of the tractor upon the ground when proceeding over ordinary obstructions or unevenness of soil and that under unusual conditions the vertical swinging movement of the rear wheels about the main frame is limited and the driver's seat is independent of the swinging of the rear wheels.

I am aware that the details of construction herein shown and described are capable of some variations and change and I desire it to be understood that such changes in construction as come within the scope of the appended claims are within the spirit of my invention.

What I claim as my invention is:

1. In a tractor, the combination, with the front tractor wheels and main frame, of a rearwardly extending tongue pivotally secured to said frame, rear tongue-supporting wheels, a member swingingly mounted upon the tongue, means for limiting the swinging movement of said member, a yoke secured to said member and carrying said wheels, and means for adjusting the position of said yoke with respect to said member to vary the height of the rear end of the tongue from the ground.

2. In a tractor, the combination, with the front tractor wheels and main frame, of a rearwardly extending tongue pivotally secured to said frame, rear tongue-supporting wheels, a member swingingly mounted upon the tongue, means for limiting the swinging movement of said member, a yoke pivotally secured at its transverse portion to said member and having axles integral with its arms upon which said rear wheels are mounted, and means for securing said yoke to said member in different positions of vertical adjustment.

3. In a tractor, the combination, with the front tractor wheels and main frame, of a rearwardly extending tongue pivotally secured at its front end to said frame, a sleeve revolubly mounted on said tongue and provided with slots, a member secured to said tongue and having parts disposed in said slots to limit the swinging movement of said sleeve, and rear wheels carried by said sleeve.

4. In a tractor, the combination, with the main frame and tractor wheels therefor, of a tongue connected at one end to said frame, a sleeve mounted on said tongue near its other end and capable of a swinging movement with respect thereto, a second sleeve fixed to said tongue and coöperating with the other sleeve to limit its swinging movement, a yoke member carried by the sleeve capable of swinging movement, and supporting wheels carried by said yoke member.

5. In a tractor, the combination, with the front tractor wheels and main frame, of a rearwardly extending tongue pivotally secured to said frame, rear tongue-supporting wheels, a yoke connected with said tongue and carrying said wheels, said yoke being free at all times to have a limited swinging movement with respect to said rearwardly extending tongue, and means for adjusting the position of said yoke to vary the height of the rear end of the tongue from the ground.

In testimony whereof I affix my signature.

JAMES JESSEN.